F. L. MARTINDALE.
EFFICIENCY METER.
APPLICATION FILED APR. 19, 1915.

1,293,155.

Patented Feb. 4, 1919.
5 SHEETS—SHEET 3.

WITNESSES
E. R. Barritt
H. W. Kreinbring

INVENTOR
Frank L. Martindale,
by Pagelsen & Spencer.
ATTORNEYS

F. L. MARTINDALE.
EFFICIENCY METER.
APPLICATION FILED APR. 19, 1915.

1,293,155.

Patented Feb. 4, 1919.
5 SHEETS—SHEET 5.

WITNESSES
E. H. Barrett
H. W. Kreinbring

INVENTOR
Frank L. Martindale
by Pagelsen & Spencer
ATTORNEYS

UNITED STATES PATENT OFFICE.

FRANK L. MARTINDALE, OF SAGINAW, MICHIGAN.

EFFICIENCY-METER.

1,293,155.   Specification of Letters Patent.   Patented Feb. 4, 1919.

Application filed April 19, 1915. Serial No. 22,472.

*To all whom it may concern:*

Be it known that I, FRANK L. MARTINDALE, a citizen of the United States, residing at Saginaw, in the county of Saginaw and State of Michigan, have invented a new and useful Efficiency-Meter, of which the following is a specification.

The efficiency of a given instrumentality or means at any instant is, of course, dependent on the relation of its output, of whatever nature, to the total effort, energy or material consumed in obtaining that output, and may be represented in various ways, for example, by the number of pounds of water evaporated per pound of coal consumed, by the cost of the plant per horse power hour or per kilowatt hour, or by the total expense incident to an operation or series of operations upon a particular article in a given machine, or by the cost of labor per article produced in the machine. Being a variable quantity, any record of either or all of the variables on which efficiency depends does not of itself indicate the efficiency, but only supplies data from which it may be computed.

The main object of the present invention is to provide means whereby the relationship of a plurality of quantities, one or more being variable, is indicated and preferably recorded; other objects are to provide means for simultaneously recording and indicating the totals of the individual quantities; to provide means responsive to and indicative of the numerical relation between a plurality of series of independent movements, each series of which corresponds to the repetition of a given condition or movement in the instrumentality or means being tested; to provide means for independently determining the amount of the individual movements of each series whereby an expression may be had not only of the number of repetitions of a given condition, but also of their value and significance with reference to the operation or economy of the instrument; and to provide a device wherein logarithmic cams are utilized to constantly indicate the ratio between the variables on which the efficiency, or other result desired, depends.

The nature of the invention will be more fully understood from a consideration of the following description and accompanying drawings in which.

Similar reference characters refer to like parts throughout the several views.

Figures 1, 2:
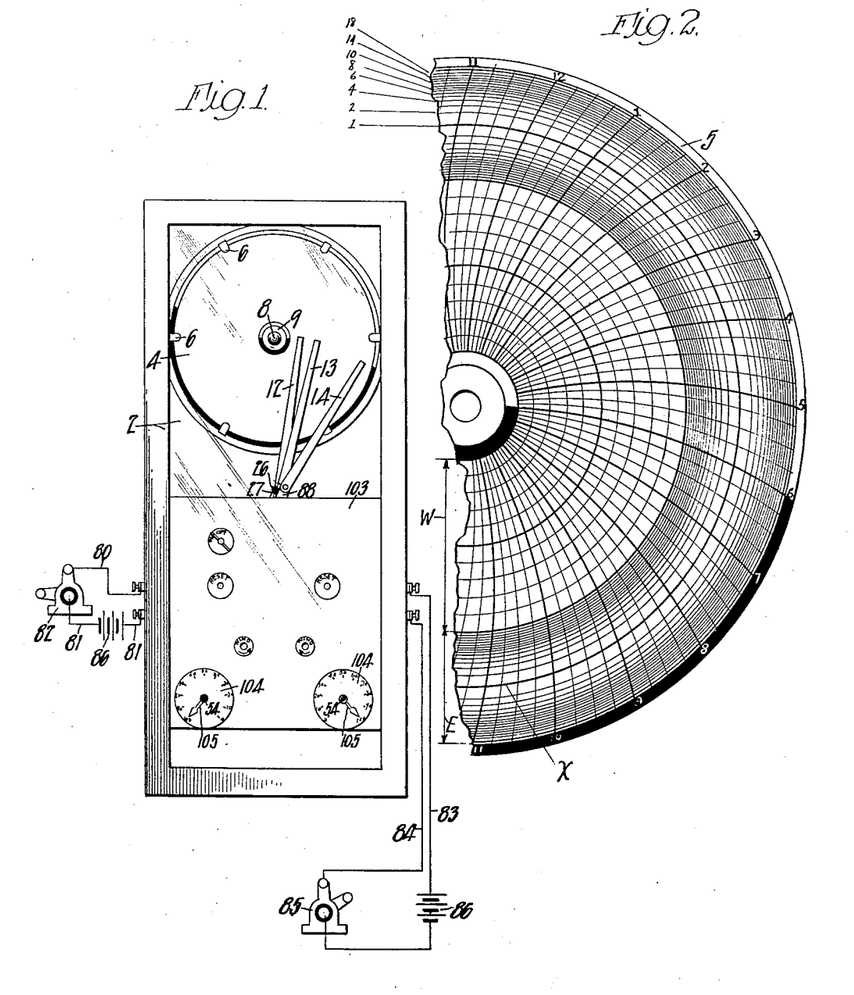
Figure 1 is a front view of a preferred form of the device showing diagrammatically one manner in which it may be connected to elements responsive to the quantities that are to be indicated or recorded, the dial card being removed.
Fig. 2 is an enlarged view of one form of dial card on which the record may be made.
Figure 4:
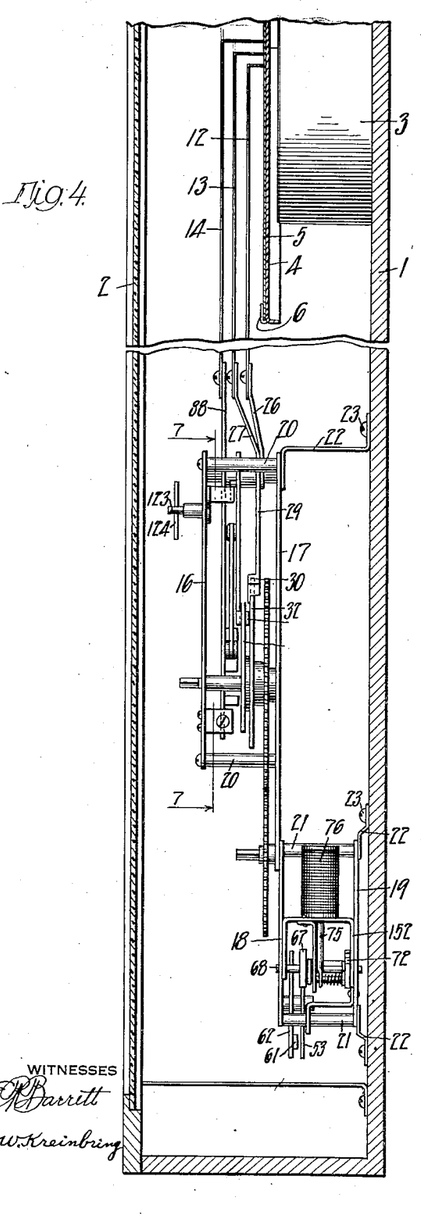
Fig. 4 is a side view corresponding to Fig. 3, the driving springs and certain intermediate gearing being omitted.

In the embodiment of my invention shown, 1 indicates a casing, the front side of which is closed by a glass door 2. The casing may be supported in any desired manner and contains a clock mechanism 3 having a face 4 (Fig. 4) on which a dial card 5 (preferably paper) may be detachably supported by clips 6 struck from the face. The card may be detachably clamped to the main clock shaft 8 by any desired device 9 (Fig. 1), and said shaft is preferably arranged to rotate once in twenty-four hours.

The ruling of the card will, of course, correspond to the particular use for which the device is intended; if for power plant purposes, the portion represented by the arrow W (Fig. 2) may indicate weight, and is traversed independently by a coal-recording pen 12 (Fig. 1) and by a second pen 13, which may record the weight of water admitted, or of the steam produced. The remaining or outer portion—indicated by the arrow E—would then represent the ratio of the total coal to the total water or steam, as the case may be; in other words, the efficiency. The central heavy black line X represents a ratio of 1 to 1, and the space on both sides of this line is divided by concentric circles, the distance between which varies in accordance with the logarithms of numbers.

Since the ratio of two numbers is determined logarithmically by subtracting the logarithm of the divisor from that of the dividend and looking up the anti-logarithm of the remainder to determine the quotient, it is apparent that, if the concentric logarithmic lines in the space E are designated by their anti-logarithms, and if means is devised for causing a movement of a pen 14 at right angles to these lines in proportion to the logarithm of a similar movement of the pen 13 minus the logarithm of like movement of the pen 12, the ratio of these movements may be read directly from the concentric circles, and will be recorded thereon as the dial revolves.

Figure 7:
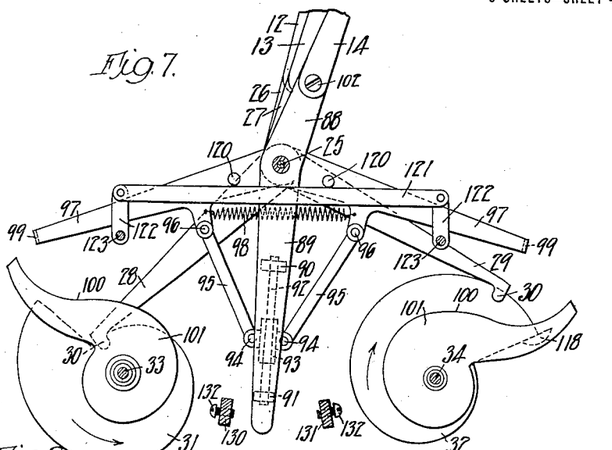
Fig. 7 is a fragmentary section on the line 7—7 of Fig. 4, showing the pointer controlling arms lifted from the logarithmic cams to allow resetting of the pens.
Figure 8:
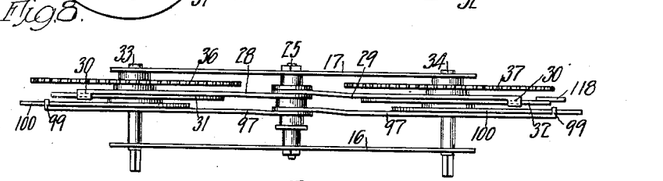
Fig. 8 is a plan view corresponding to Fig. 7, the re-setting device being omitted.
Figure 9:
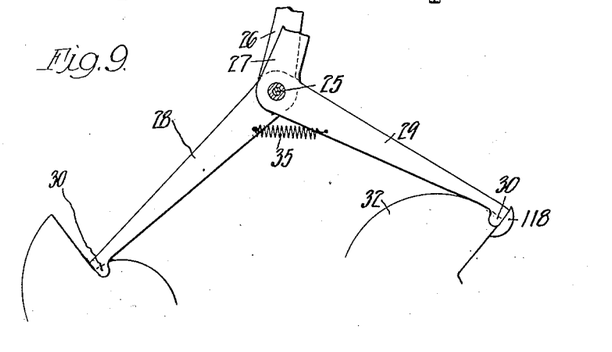
Fig. 9 is a fragmentary view of the lower ends of the variable-quantity responsive arms in initial position on the constant increment cams.

The mechanism for operating the pens is mounted on a front plate 16 (Fig. 4), an intermediate plate 17—18 (which may be considered as one), and a back plate 19, the two first mentioned being joined by posts 20 and the latter two by posts 21, and the whole attached to the casing by clips 22 and screws 23. Extending between the upper ends of the plates 16, 17—18 is a pen lever shaft 25 upon which is mounted a pen lever 26 for the pen 12 and a pen lever 27 for the pen 13. The levers comprise, respectively, oppositely extending arms 28 and 29 (Fig. 7), the outer ends 30 of which may be divided to embrace the edges of the duplicate cams 31 and 32 that are rigidly secured to the spaced cam shafts 33 and 34, and may be held in bearing engagement therewith by a tension spring 35 (Fig. 9). The face of each of these cams departs from the center of the corresponding shaft a fixed amount per degree of angular space—they may be termed constant increment cams; and, as the divided end of either lever lies in substantially the same circle, with reference to the shaft 25 as a center, as does the corresponding cam shaft, it will be seen that the angular movements of the pens 12 and 13 are proportionate, respectively, to that of the cams 31 and 32.

Figure 3:
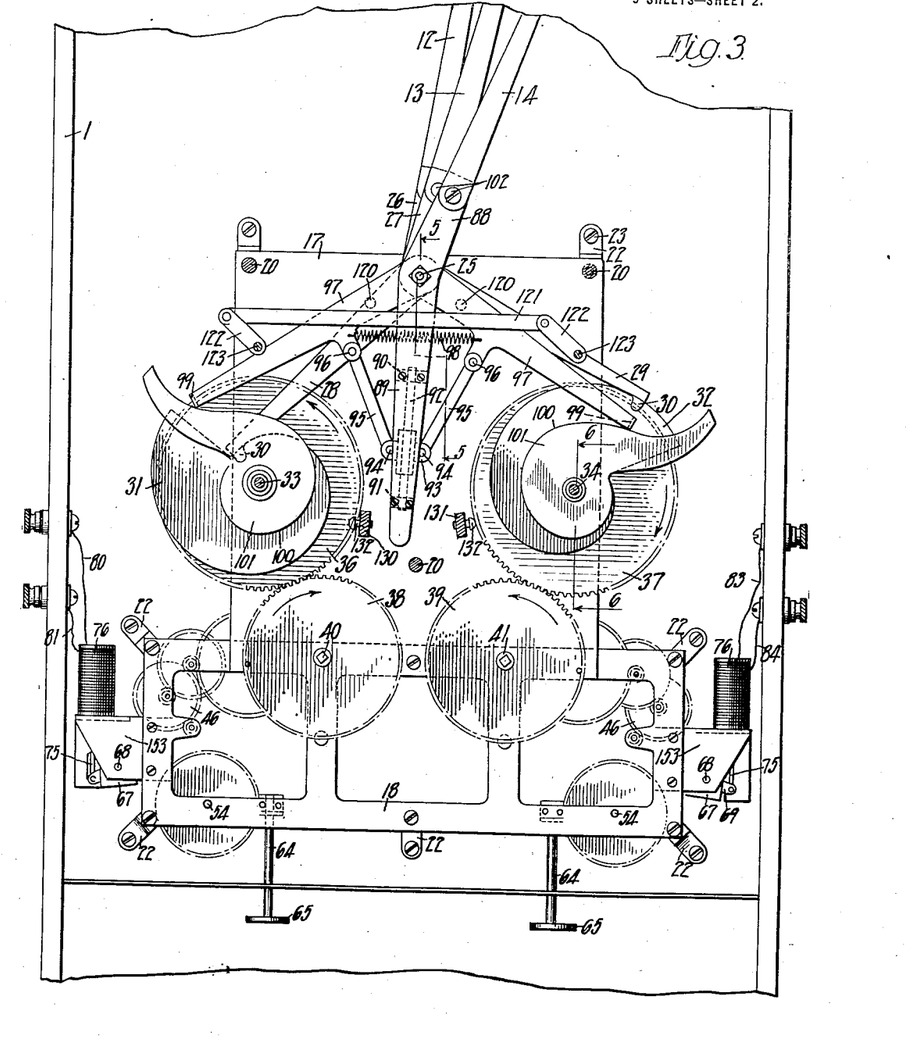
Fig. 3 is a front view of the lower end of the device, the cover plate being removed and certain parts being omitted.
Figure 10:
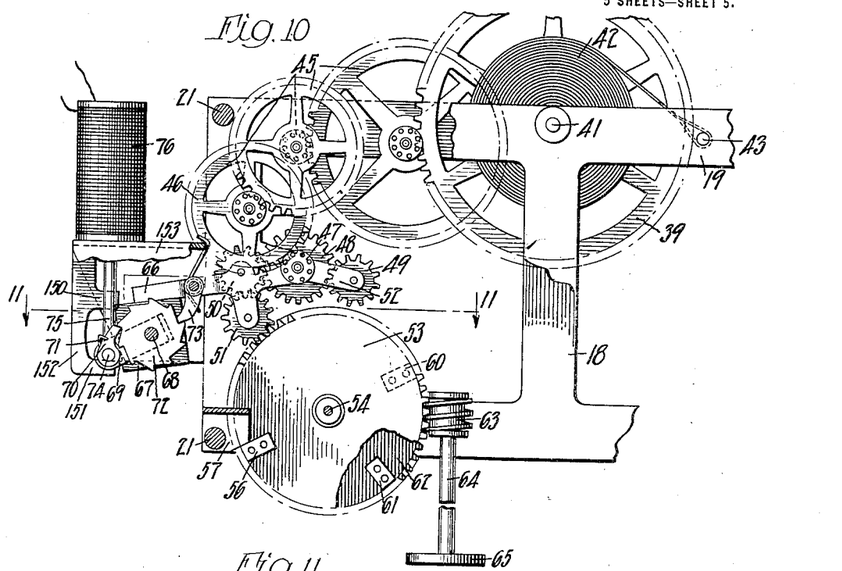
Fig. 10 is a rear view of one of the escapement mechanisms, parts being broken away.

The latter may be independently moved angularly by the gears 36 and 37 mounted on the cam shafts 33 and 34. These gears mesh, respectively, with gears 38 and 39 (Fig. 3) secured to the winding shafts 40 and 41, to which are attached clock springs 42 (but one of which is shown, Fig. 10) anchored at 43 to the frame; and the springs normally tend to turn the gear 36 in counter-clockwise direction and the gear 37 in clockwise direction, as indicated by the arrows in Fig. 3. The amount of movement of either of the gears is determined by mechanism which, being in duplicate, will be described with reference to the gear 39 only. Meshing with this gear is a train of reduction gearing designated as a whole by the numeral 45 (Fig. 10), the fastest moving gear 46 of which transmits its motion through the pinion 47 to the common gear 48 of the reversing train 48, 49, 50 and 51, the three last named gears being mounted in a frame 52 that is tiltable about the axes of the gears 47—48. As the tilting takes place, the gears 49 and 51 are thrown alternately into mesh with and cause reverse movements of the escapement pinion 53 loosely mounted upon the shaft 54; and the movement of the escapement gear in clockwise direction (Fig. 10) is limited by contact of a lug 56, which it carries, with a fixed stop 57 secured to the frame in any desired manner. The movement of the escapement gear in the opposite direction is limited by contact of lug 60, mounted thereon, with a lug 61 that projects from a regulating gear 62 also mounted on the shaft 54. The angular position of the lug 61 may be adjusted by the worm 63 through the medium of a worm shaft 64 and thumb-piece 65.

Figures 11, 12, 13:
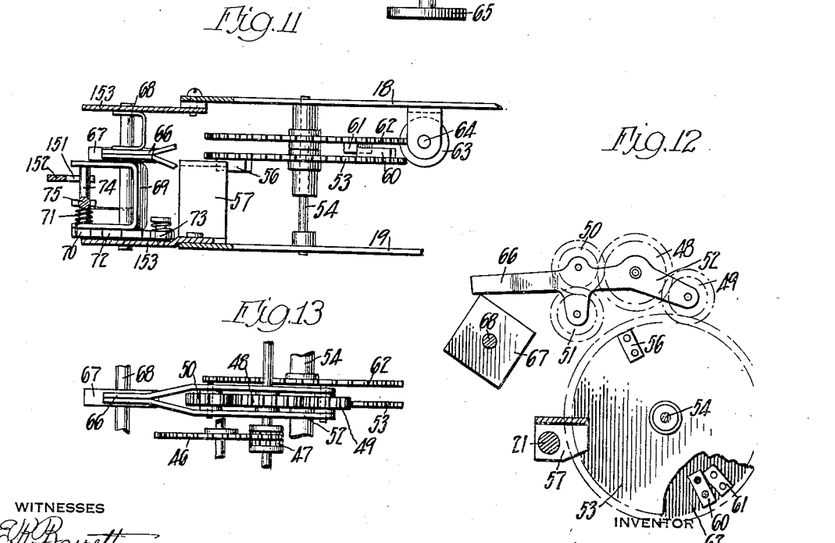
Fig. 11 is a section on the line 11—11 of Fig. 10.
Fig. 12 is a diagrammatic view showing the reversing mechanism of the escapement in a position the reverse of that shown in Fig. 10.
Fig. 13 is a plan view of the reversing mechanism and adjacent parts.

In order to tilt the frame 52 about the axis of the gear 48, the former is provided with an arm 66 arranged to rest upon an angular cam 67 fixed to a shaft 68. The latter has loosely mounted thereon a link 69 that carries a dog 70 held in contact, by means of a spring 71, with the teeth of a ratchet gear 72 rigid with the shaft 68. Reverse movement of the cam is prevented by a spring-held pawl 73 arranged to engage with the teeth on the ratchet wheel. The shaft 74 on which the dog 70 is mounted also passes through the plunger rod 75 on the solenoid 76, and the movement of link 69 about the shaft 68 may be limited by contact of the shaft 74 with the lugs 150 and 151 on a plate 152 secured to the base 153 of the solenoid. Every second movement of the solenoid rod rotates the cam to such an angle that the arm 66 is elevated to bring the gear 49 into mesh with the escapement gear as indicated in Fig. 12; the alternate movements allow it to drop down into the position shown in Fig. 10.

Circuit wires 80 and 81 (Fig. 1) extend from the corresponding solenoid 76 through binding posts on the left side of the casing to any desired form of contact device 82, the operation of which is dependent on repetitions of movements or conditions of a given kind in the machine or instrumentality being tested. Similar wires 83 and 84 on the opposite side of the mechanism lead to another contact device 85, whereby impulses are sent through the corresponding solenoid 76 in unison with the recurrence of another condition or movement in the same machine or instrumentality. The circuits are, of course, provided with suitable sources 86 of electric current.

It will be seen that the reducing trains 46 and escapement mechanisms allow the springs 42 to turn the corresponding cam 31 or 32 slightly at each impulse of the respective solenoid 76; and the amount of these individual steps in the cam movements is determined by the angular adjustment of the regulating gear 62. Therefore, the pen 12 or 13 (the levers of which are initially set in the positions shown in Fig. 9), as the case may be, receives a swinging movement in a clockwise direction (Figs. 1 and 3), proportionate not only to the number of recurrences of a given condition in the machine tester, but also dependent on the value of the condition, assuming that the regulating gear has been properly set to correspond to that value. For example, if the machine tested is a boiler plant and the contact device 82 is dependent on feeding movements of the stoker, and if the stoker by calibration has been found to deliver, say, fifty pounds at each stroke—to which the regulating gear is properly set—the pen 12 will trace upon the moving dial a spiral curve that represents the total amount of coal fed between the time the test was begun and any later period. Likewise, if the contact device 85 is made responsive to the movements of a water weigher, the pen 13 will trace a curve that represents the total amount of water fed.

Mechanism for indicating the ratios of these two quantities will now be described:—

Figure 5:
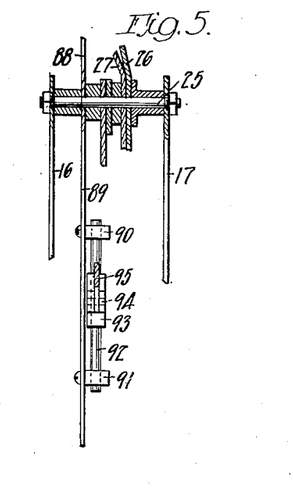
Fig. 5 is a section on the line 5—5 of Fig. 3.

Mounted to swing upon the shaft 25, is a ratio pen lever 88 for the pen 14, the lower arm 89 of which may extend downwardly between the cam shafts 33 and 34 and may support, by means of brackets 90 and 91 (Figs. 5 and 7), a guide 92. Slidable upon the latter is a cross-head 93, to which is pivotally connected at the points 94 links 95 that are in turn pivotally connected at points 96 to the oppositely disposed controlling bars 97, loosely mounted to swing upon the pen shaft. These controlling members are preferably connected by a tension spring 98 (Figs. 3 and 7), and have their outer ends 99 bent or otherwise formed to bear upon the logarithmic face 100 of the cam 101 that is rigidly secured to the corresponding cam shaft 33 or 34.

Since the cams 101 are rigid with the cams 31 and 32, and since radial planes through either of the cam shafts intersect the faces of the constant increment cams at points that depend on the amount of angular rotation of the latter (which in turn is dependent on a summation of the condition to which they are applied in the machine being tested) and, further, since the same radial planes intersect the logarithmic cam faces 100 at points which represent the logarithm of the corresponding condition-summation on the constant increment cams, it follows that the movements of the controlling bars 97 are dependent on and proportional to the logarithms of the numbers that represent the corresponding condition-summations of the different elements being ascertained. It will also be seen upon reflection that inasmuch as the cams at the right (Figs. 3 and 7) turn clockwise, and those at the left turn counter-clockwise from the initial position shown in Fig. 9, each increase in the summation of a given condition (to which either of the cam pairs 31—101 or 32—101 is responsive) swings the member 88—89 proportionately in one direction about the pen shaft 25, while an increase in the summation of the condition to which the other cam pair is responsive swings the same member proportionately in the opposite direction. Stated otherwise, one set of cams may be said to impress upon the member 88—89 a movement representing the logarithm of the summation of one of the conditions, whereas the other cam-set impresses upon the member an opposite (or subtracting) movement in accordance with the summation of the other condition. The actual movement of the pen 14, therefore, is proportional to the differences in the logarithms of the two conditions, or, in other words, when read on the logarithmic scale E, to the ratio of the conditions themselves.

In order to allow convenient adjustment of the pens with respect to the dial, they are each preferably connected to the corresponding lever arms by screws 102. Also, the operating mechanism may be concealed by a plate 103 (Fig. 1), and the latter may be provided with dials 104 over which pointers 105 may sweep to indicate the adjustment of the regulating gear 62. This adjustment, it will be understood, corresponds to a known value of the condition or movement of the machine or instrumentality to which the contact device 82 or 85 is attached. Thus, if the machine be a stoker that feeds fifty pounds of fuel per stroke, the pointer at the left (Fig. 1) is set at fifty; and if, at the same time, the contact device 85 is connected to a water weigher that discharges seventy pounds of water at each movement, the pointer at the right is set at seventy; and, in each instance, the throw of the escapement wheel—in other words, the separate movements of the cam-sets—will be proportional to the pointer indications.

Figure 6:
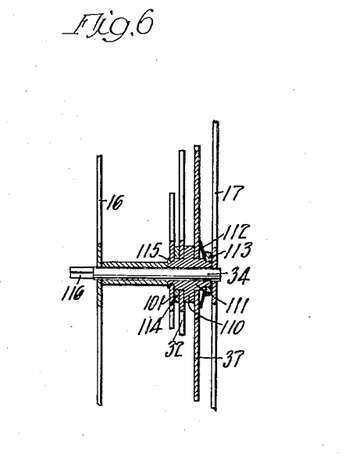
Fig. 6 is a section on the line 6—6 of Fig. 3.

After the device has been in operation the period required for one revolution of the dial card, it becomes necessary to re-set the pens to their initial positions. For this purpose the gears 36 and 37 are held in rotative engagement with the cams by frictional means, instead of being fixed to the corresponding shafts. This may be conveniently accomplished in the manner indicated in Fig. 6, in which it will be seen that the gear 37 is frictionally held against a flange 110 integral with the hub 111 (fixed to the shaft 34) by a thin conical or spherical washer 112 that is retained on the hub by a washer 113 riveted or otherwise secured thereto. On the other hand, the cams 32 and 101 and the interposed filler 114 are held rigid with the cam shafts by riveting or upsetting the end of the hub at 115. This construction consequently allows a key to be applied to the end 116 of the shaft 34 to turn the latter and the cams independently of the gear 37 until the cams assume their initial position (Fig. 9), which is determined when the divided ends 30 of the control bars 28 and 29 are struck, respectively, by the radial edge of the cam 31 and by the projection 118 on the cam 32.

Were no means present to prevent it, particularly in those instances in which the summation-totals are large, a locking action might occur between the outer ends of the logarithmic faces 101 and the ends 99 of the bars 97 before the cams had reached their initial position. In that case, the bars may be provided with pins 120 (Fig. 3) with which a bar 121 mounted at its ends upon links 122 pivoted to the plate 16 at 123, is adapted to engage. One of the pivots 123 may have its end shaped to receive a key or cross-arm 124 (Fig. 4) by means of which the bar 121 may be elevated to lift the control bars from the logarithmic cams. In many instances, however, the dial may be so calibrated, or the use to which the meter is to be put is such, that the ends 99 need never pass over the flatter portions of the logarithmic faces, in which case the control bar lifting mechanism may be omitted.

If desired, lugs 130 and 131 (Figs. 3, 4 and 7), having screws 132, may project rearwardly from the plate 16 to limit the angular movement of the member 88—89 and thus prevent the pen 14 from swinging off from the portion E of the dial.

Obviously, the details of the device may be widely changed without departing from the spirit of the invention; and it may be applied for many purposes other than those suggested. I do not, therefore, wish to be limited otherwise than as indicated by the subjoined claims.

I claim:

1. A calculating machine comprising in combination a moving record sheet, three tracers arranged to move transversely in respect to the sheet to trace curves thereon, means for causing one of the tracers to move in accordance with increments of a quantity whereby it traces a curve on the record sheet corresponding to a summation of the quantity, means for causing another of the tracers to move in accordance with increments of a second quantity whereby it traces a curve on the record sheet corresponding to a summation of the quantity, and means for causing the third tracer to move in accordance with a desired function of the quantities whereby it traces a curve on the record sheet expressive of said desired function.

2. In combination two sets of cams, each set comprising a plurality of cams rotatable about the same axis, the face of one of the cams of each set having a constant increment per degree of angular turn, the face of the other cam of each set being logarithmic, means for independently turning the sets of cams about their axes, levers bearing on the faces of the constant increment cams, and rotatable about a common axis, a ratio indicating device pivoted to swing about the axis of the levers, said ratio indicating device comprising a longitudinal guide, a cross-head slidable on the guide, control members pivoted to swing about the axis of the levers, each of the control members having an end bearing upon the face of the corresponding logarithmic cam, links pivoted to the cross-head and to the corresponding control member, the whole arrangement being such that the movement of the ratio indicating device is proportionate to the difference of the logarithms of the independent movements of the cam sets.

3. In combination two sets of cams, each set comprising a plurality of rigidly connected cams rotatable about a common axis, one of the cams being of the constant increment type and another being logarithmic, gears for independently turning the sets of cams from initial positions, levers bearing on the constant increment cams, a ratio responsive member pivoted to swing about a fixed axis, said ratio responsive member including a longitudinal guide and a member slidable in respect to the guide, pivoted control members for the ratio responsive member, each of the control members bearing on the corresponding logarithmic cam, and link connections between the slidable member and the control members, whereby the ratio responsive member is caused to move in proportion to the logarithm of the angular movement of the cams of one set minus the logarithm of the angular movement of the cams of the other set, and a logarithmic scale whereon the movement of the ratio responsive member may be read.

4. In combination, two sets of cams, each set comprising a plurality of rigidly connected cams rotatable about a common axis, one of the cams being of the constant increment type and another being logarithmic, gears for independently turning the sets of cams from initial positions, levers bearing on the constant increment cams, a ratio responsive member pivoted to swing about a fixed axis, said ratio responsive member including a longitudinal guide and a member slidable in respect to the guide, pivoted control members for the ratio responsive member, each of the control members bearing on the corresponding logarithmic cam, and link connections between the slidable member and the control members, whereby the ratio responsive member is caused to move in proportion to the logarithm of the angular movement of the cams of one set minus the logarithm of the angular movement of the cams of the other set, and a logarithmic scale whereon the movement of the ratio responsive member may be read, said cam sets being movable independently of the corresponding gears by which they are driven, whereby they may be returned to initial position.

5. In combination two sets of cams, each set comprising a plurality of rigidly connected cams rotatable about a common axis, one of the cams being of the constant increment type and another being logarithmic, gears for independently turning the sets of cams from initial positions, levers bearing on the constant increment cams, a ratio responsive member pivoted to swing about a fixed axis, said ratio responsive member including a longitudinal guide and a member slidable in respect to the guide, pivoted control members for the ratio responsive member, each of the control members bearing on the corresponding logarithmic cam, and link connections between the slidable member and the control members, whereby the ratio responsive member is caused to move in proportion to the logarithm of the angular movement of the cams of one set minus the logarithm of the angular movement of the cams of the other set, a logarithmic scale whereon the movement of the ratio responsive member may be read, said cam sets being movable independently of the corresponding gears by which they are driven, whereby they may be returned to initial position, and means whereby the control members may be removed from contact with the logarithmic cams during the last mentioned movement of the cams.

6. In combination two sets of cams, each set comprising a plurality of rigidly connected cams rotatable about a common axis, one of the cams being of the constant increment type and another being logarithmic, gears for independently turning the sets of cams from initial positions, levers bearing on the constant increment cams, a ratio responsive member pivoted to swing about a fixed axis, said ratio responsive member including a longitudinal guide and a member slidable in respect to the guide, pivoted control members for the ratio responsive member, each of the control members bearing on the corresponding logarithmic cam, and link connections between the slidable member and the control members, whereby the ratio responsive member is caused to move in proportion to the logarithm of the angular movement of the cams of one set minus the logarithm of the angular movement of the cams of the other set, a logarithmic scale whereon the movement of the ratio responsive member may be read, said cam sets being movable independently of the corresponding gears by which they are driven, whereby they may be returned to initial position, and means whereby the control members may be removed from contact with the logarithmic cams during the last mentioned movement of the cams, said last mentioned means including a bar pivoted on links at each end thereof and means whereby the links may be swung in a vertical plane to elevate the bar into contact with the control members.

7. In combination two sets of cams, each set comprising a plurality of rigidly connected cams rotatable about a common axis, one of the cams being of the constant increment type and another being logarithmic, gears for independently turning the sets of cams from initial positions, levers bearing on the constant increment cams, a ratio responsive member pivoted to swing about a fixed axis, said ratio responsive member including a longitudinal guide and a member slidable in respect to the guide, pivoted control members for the ratio responsive member, each of the control members bearing on the corresponding logarithmic cam, and link connections between the slidable member and the control members, whereby the ratio responsive member is caused to move in proportion to the logarithm of the angular movement of the cams of one set minus the logarithm of the angular movement of the cams of the other set, a logarithmic scale whereon the movement of the ratio responsive member may be read, and frictional connections between said cam sets and the corresponding gears, whereby they may be returned to initial positions without turning the gears.

8. In combination with an instrumentality concerning which information is desired, means responsive to the recurrence of a condition in the instrumentality, escapement means for governing the response of the responsive means whereby the degree of response to the recurrences of the condition may be made to correspond to the numerical value of the condition, means responsive to the recurrence of another condition in the instrumentality, escapement means for governing the response of the last mentioned responsive means whereby the degree of response may be made to correspond to the numerical value of the last mentioned condition, and means for constantly indicating the ratio of the one condition to the other.

9. In combination with an instrumentality concerning which information is desired, means responsive to the recurrence of a condition in the instrumentality, escapement means for governing the response of the responsive means whereby the degree of response to the recurrences of the condition may be made to correspond to the numerical value of the condition, means responsive to the recurrence of another condition in the instrumentality, escapement means for governing the response of the last mentioned responsive means whereby the degree of response may be made to correspond to the numerical value of the last mentioned condition, means for constantly indicating the ratio of the one condition to the other, each of said escapement means including an escapement pinion, means for alternately rotating the pinion in opposite directions, and means for limiting the rotative movement of the pinion.

10. In combination with an instrumentality concerning which information is desired, means responsive to the recurrence of a condition in the instrumentality, escapement means for governing the response of the responsive means whereby the degree of response to the recurrences of the condition may be made to correspond to the numerical value of the condition, means responsive to the recurrence of another condition in the instrumentality, escapement means for governing the response of the last mentioned responsive means whereby the degree of response may be made to correspond to the numerical value of the last mentioned condition, means for constantly indicating the ratio of the one condition to the other, each of said escapement means including an escapement pinion, means for turning it in one direction at one of the recurrences of one of the conditions, and for turning it in the opposite direction at an alternate recurrence of the same condition, and means for limiting the turning movement in either direction.

11. In combination with an instrumentality concerning which information is desired, means responsive to the recurrence of a condition in the instrumentality, escapement means for governing the response of the responsive means whereby the degree of response to the recurrences of the condition may be made to correspond to the numerical value of the condition, means responsive to the recurrence of another condition in the instrumentality, escapement means for governing the response of the last mentioned responsive means whereby the degree of response may be made to correspond to the numerical value of the last mentioned condition, means for constantly indicating the ratio of the one condition to the other, each of said escapement means including an escapement pinion, means for turning it in one direction at one of the recurrences of one of the conditions, and for turning it in the opposite direction at an alternate recurrence of the same condition, a regulating gear, a stop carried by the regulating gear with which the escapement pinion contacts to limit the movement of the latter in one direction, and means for turning the regulating gear about its axis to vary the position of the stop.

12. In combination with an instrumentality concerning which information is desired, means responsive to the recurrence of a condition in the instrumentality, escapement means for governing the response of the responsive means whereby the degree of response to the recurrences of the condition may be made to correspond to the numerical value of the condition, means responsive to the recurrence of another condition in the instrumentality, escapement means for governing the response of the last mentioned responsive means whereby the degree of response may be made to correspond to the numerical value of the last mentioned condition, means for constantly indicating the ratio of the one condition to the other, each of said escapement means including an escapement pinion, means for limiting its movement, and electrically operated means for releasing it to move in synchronism with the recurrence of the corresponding condition in the instrumentality.

13. In combination with an instrumentality concerning which information is desired, means responsive to the recurrence of a condition in the instrumentality, escapement means for governing the response of the responsive means whereby the degree of response to the recurrences of the condition may be made to correspond to the numerical valve of the condition, means responsive to the recurrence of another condition in the instrumentality, escapement means for governing the response of the last mentioned responsive means whereby the degree of response may be made to correspond to the numerical value of the last mentioned condition, means for constantly indicating the radio of the one condition to the other, each of said escapement means including an escapement pinion, means for limiting its movement in either direction, means tending to turn the escapement pinion, reversing mechanism for causing it to turn alternately in opposite directions and electrically operated means for governing the operation of the reversing mechanism.

14. In combination with an instrumentality concerning which information is desired, means responsive to the recurrence of a condition in the instrumentality, escapement means for governing the response of the responsive means whereby the degree of response to the recurrences of the condition may be made to correspond to a variable numerical value of the condition, means responsive to the recurrence of another condition in the instrumentality, and means for constantly indicating the ratio of the one condition to the other.

15. In combination with an instrumentality concerning which information is desired, a calculating machine comprising a movable graduated record sheet, means responsive to the recurrence of a condition in the instrumentality for scribing on the sheet, adjustable means for governing the degree of response whereby it may be made to correspond to the value of the condition, means responsive to the recurrence of another condition in the instrumentality for scribing on the sheet, and means for scribing on the sheet a record of a desired function of the two conditions.

16. In combination with an instrumentality concerning which information is desired, a calculating machine comprising a movable graduated record sheet, means responsive to the recurrence of a condition in the instrumentality for scribing on the sheet, an adjustable escapement for governing the degree of response whereby it may be made to correspond to the value of the condition, means responsive to the recurrence of another condition in the instrumentality for scribing on the sheet, adjustable escapement means for governing the degree of response whereby it may be made to correspond to the value of the last named condition, and means for scribing on the sheet a record of a desired relation between the two conditions.

17. In combination with an instrumentality concerning which information is desired, a recorder comprising a movable graduated record sheet, time controlled means for moving the sheet, means for scribing on the sheet a line that indicates both the amount and rate of change of a condition in the instrumentality, means for scribing on the sheet a second line that indicates both the amount and rate of change of a second condition in the instrumentality, and means for scribing on the sheet a third line that indicates the relation of the two conditions to each other.

In testimony whereof I sign this specification in the presence of two subscribing witnesses.

FRANK L. MARTINDALE.

Witnesses:
L. M. SPENCER,
HUGO W. KREINBRING.